United States Patent [19]
Cumbie

[11] Patent Number: 5,120,102
[45] Date of Patent: Jun. 9, 1992

[54] LOAD BEARING VEHICLE EXTENSION

[76] Inventor: Richard L. Cumbie, P.O. Box 1031, Daniel Rd., Thomaston, Ga. 30286

[21] Appl. No.: 695,212

[22] Filed: May 3, 1991

[51] Int. Cl.⁵ .............................................. B60P 3/00
[52] U.S. Cl. .................................... 296/3; 296/26
[58] Field of Search ............. 296/3, 26; 224/42.42 R; 280/402

[56] References Cited

U.S. PATENT DOCUMENTS

| | | |
|---|---|---|
| 2,720,414 | 10/1955 | Hart .................................. 296/3 |
| 3,329,324 | 7/1967 | Fuller ............................... 296/3 |
| 3,770,149 | 11/1973 | Aquila ........................... 280/402 |
| 3,888,538 | 6/1975 | McWilliams ..................... 296/3 |
| 4,138,046 | 2/1979 | DeFreze ........................... 296/3 |
| 4,405,170 | 9/1983 | Raya ................................ 296/3 |
| 4,770,458 | 9/1988 | Burke et al. ..................... 296/3 |
| 4,779,916 | 10/1988 | Christie ........................... 296/3 |

*Primary Examiner*—Robert R. Song
*Attorney, Agent, or Firm*—Hurt, Richardson, Garner, Todd & Cadenhead

[57] ABSTRACT

A load bearing vehicle extension which is releasably secured to the rear of a vehicle which is adjustable for different length and width loads such that loads longer than the cargo area of the vehicle may be carried safely.

12 Claims, 4 Drawing Sheets

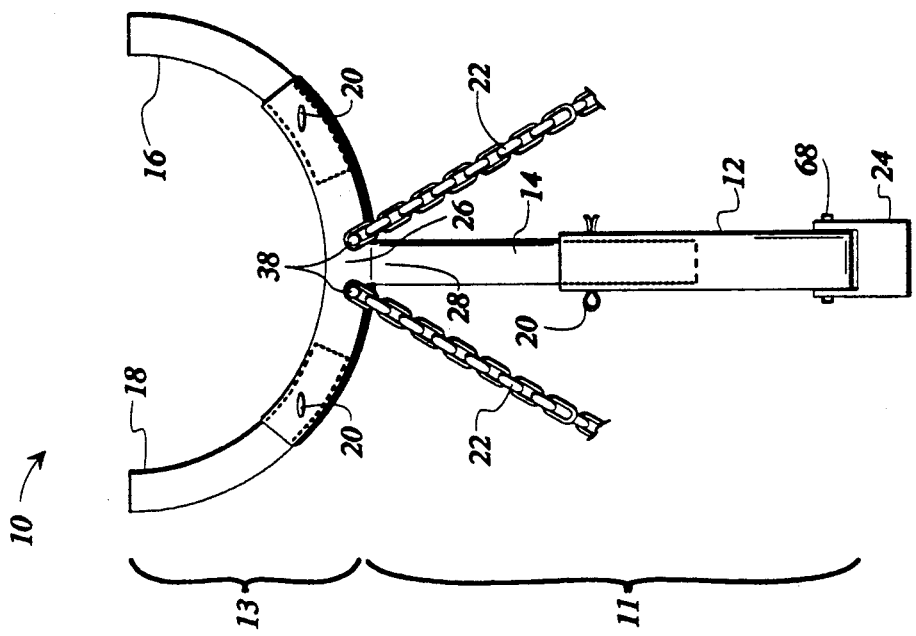
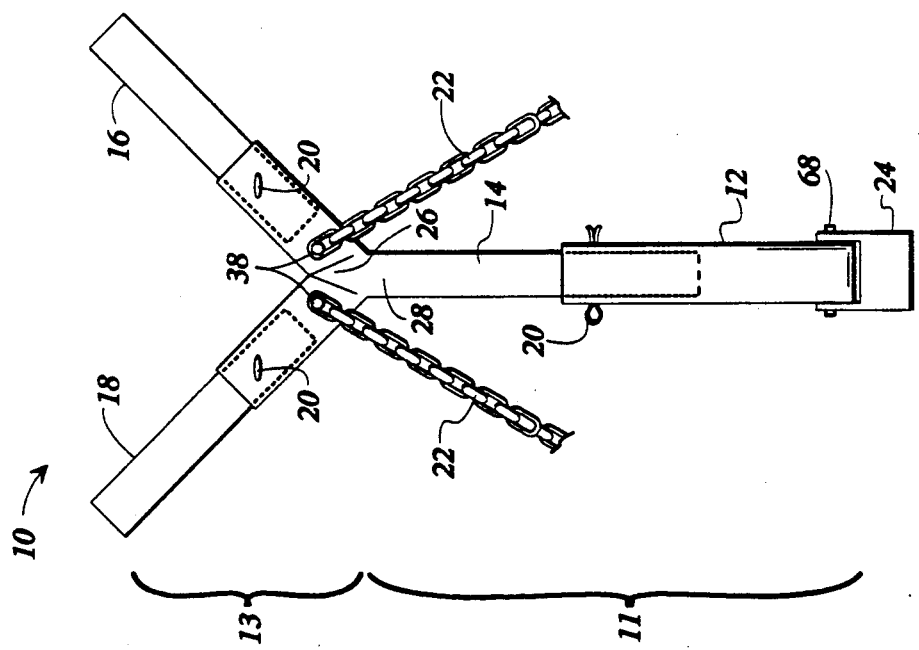

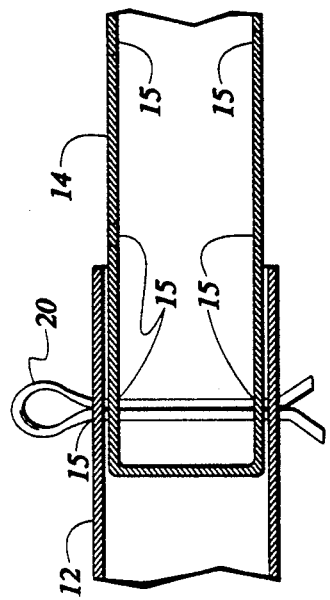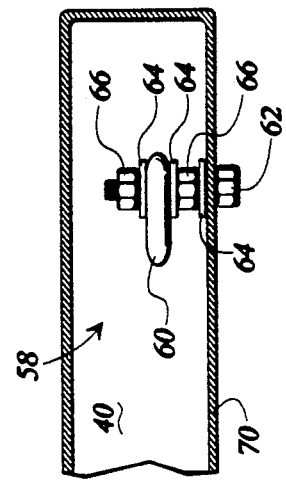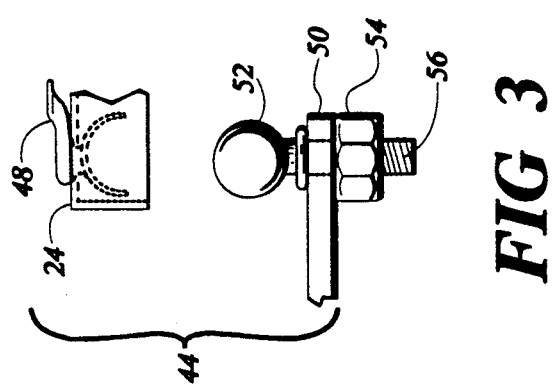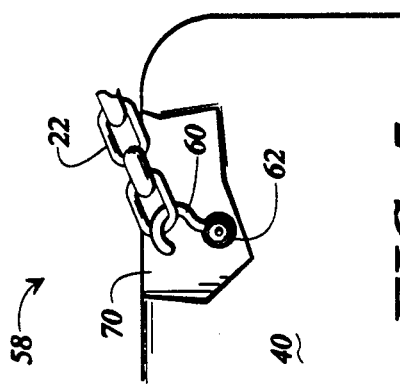

LOAD BEARING VEHICLE EXTENSION

BACKGROUND OF THE INVENTION

1. Field of the Invention

This invention generally relates to the field of vehicle extensions or load racks which allow one to carry loads on a vehicle, and specifically relates to a load bearing vehicle extension which is releasably attachable to the rear of a vehicle, such as pickup truck, by way of a typical trailer hitch, such that loads having lengths longer than the length of the truck bed can be carried securely on the vehicle.

2. Prior Art

Various methods and apparatuses have been developed for carrying loads on vehicles. The most popular of the apparatuses appear to be cargo racks attached to the body of the vehicle itself and cargo trailers attached to the vehicle by means of a hitch. However, there appears to be no prior art which combines an extension releasably attached to the rear of a vehicle which cooperates with the vehicle itself so as to create an extended load carrying area comprising the vehicle and the extension means.

U.S. Pat. No. 4,869,628, discloses a truck cargo rack for holding cargo in the cargo holding area of the truck. Quite simply, this truck cargo rack is attached to the bed wall of a pickup truck and comprises a frame and restraining means for holding cargo within the truck bed. This truck cargo rack only allows the securing of loads which are, at most, the size of the truck bed. This truck cargo rack does not allow one to secure loads which are longer than the truck bed itself.

U.S. Pat. No. 4,867,497, discloses a load supporting rack for attachment to a pickup truck box. This load supporting rack is secured to the front bed wall of the truck box and allows for the placement of loads on the top of the rack extending downward toward the rear end of the truck. This load supporting rack allows an elongated load to be supported over the cab of the pickup truck, but is not contemplated to allow the extension of the load beyond the tailgate of the truck.

U.S. Pat. No. 4,854,628, discloses a carrying rack for a vehicle which can be mounted onto the vehicle. This carrying rack simply is a frame upon which a load can be placed and secured. This carrying rack is not a vehicle extension allowing for the carrying of elongated loads longer than the vehicle itself U.S. Pat. Nos. 4,779,916 and 4,770,458, disclose utility racks for pickup trucks. Both of these racks are frame-like structures secured to the bed of a pickup truck having a height relatively even with the top of the cab of the truck. These racks allow one to carry and secure loads in a horizontal fashion on top of the rack and extend over the cab and the bed of the truck. Neither of these racks are vehicle extensions allowing for the carrying of an elongated load only in the bed of the truck and extending rearward from the cab of the truck.

Although each of the above patented inventions are suitable for their intended purposes, they do not solve the problem of carrying elongated loads in a safe and convenient fashion with an easily removable, simple to use vehicle extension. Each of the patented prior art is more or less designed for securing loads within the truck bed or for extending over the cab of the truck, and not rearwardly away from the rear end of the truck. For many loads, it is preferable for the load to extend rearwardly from the truck so that the load will not interfere with the forward operation of the vehicle or damage the cab of the vehicle.

BRIEF SUMMARY OF THE INVENTION

The problems described above are obviated by the present invention, which is a load bearing vehicle extension which, in its preferred embodiment, is releasably attached to the rear of a conventional pickup truck. The extension comprises a load bearing rack adjustably secured to a support trunk which is releasably secured to the vehicle itself by means of a typical ball hitch assembly. The extension is prevented from pivoting or rotating about the ball hitch by means of securing chains or cables extending between the extension and the vehicle. The extension extends rearwardly from the vehicle preferably at approximately a 135° angle from horizontal. An elongated load placed in the bed of the pickup truck and extending rearwardly out the back of the pickup truck rests on the load rack, thus creating a downward pressure placing the securing chains or cables in tension and the support trunk in compression resulting in a stable structural unit. The load bearing rack has adjustable side braces so as to accommodate loads of different widths. The support trunk also is adjustable such that the load bearing rack may be adjusted upward or downward for various length loads.

When the extension is not being used, it can be removed from the vehicle by unhooking the securing chains or cables from the truck body, unhitching the hitch from the hitch ball, adjusting the load bearing rack side braces inward so as to present a narrow footprint, and adjusting the trunk to its shortest position, resulting in an easily handlable unit which can be stored in the truck bed itself or in other locations.

Accordingly, it is an object of the present invention to provide a load bearing vehicle extension for use on a vehicle in order to carry elongated loads.

It is another object of the present invention to provide a load bearing vehicle extension which is adjustable both in height and in width so as to allow the carrying of varying width and length loads.

It is yet another object of the present invention to provide a load bearing vehicle extension which is easily attached to and removed from the vehicle.

Yet another object of the present invention is to provide a load bearing vehicle extension which will allow the carrying of elongated loads without the necessity of carrying the load over the cab of the truck.

Still another object of the present invention is to provide a load bearing vehicle extension which is not permanently attached to the vehicle itself, and can be attached and removed from the vehicle by one person in a short period of time.

It is yet another object of the present invention to provide a load bearing vehicle extension which is inexpensive to manufacture, simple to use, and efficient in operation.

These objects and other objects, features, and advantages of this invention will become apparent to one skilled in the art when the following detailed description of a preferred embodiment is read in conjunction with the attached figures in which like reference characters represent like parts throughout the several views.

BRIEF DESCRIPTION OF THE FIGURES

FIG. 2a is a front view of a first alternate embodiment of the present invention.

FIG. 2b is a front view of a second alternate embodiment of the present invention.

FIG. 3 is a side view of the trailer hitch of the present invention shown in conjunction with a typical hitch ball.

FIG. 4 is a cross-section of a preferred embodiment of the length adjusting mechanism of the present invention.

FIG. 5 is a side view, partly in section, of the means for securing the securing chains to the vehicle body.

FIG. 6 is a top view of the securing means shown in FIG. 5.

DETAILED DESCRIPTION OF A PREFERRED EMBODIMENT

Figure 1:
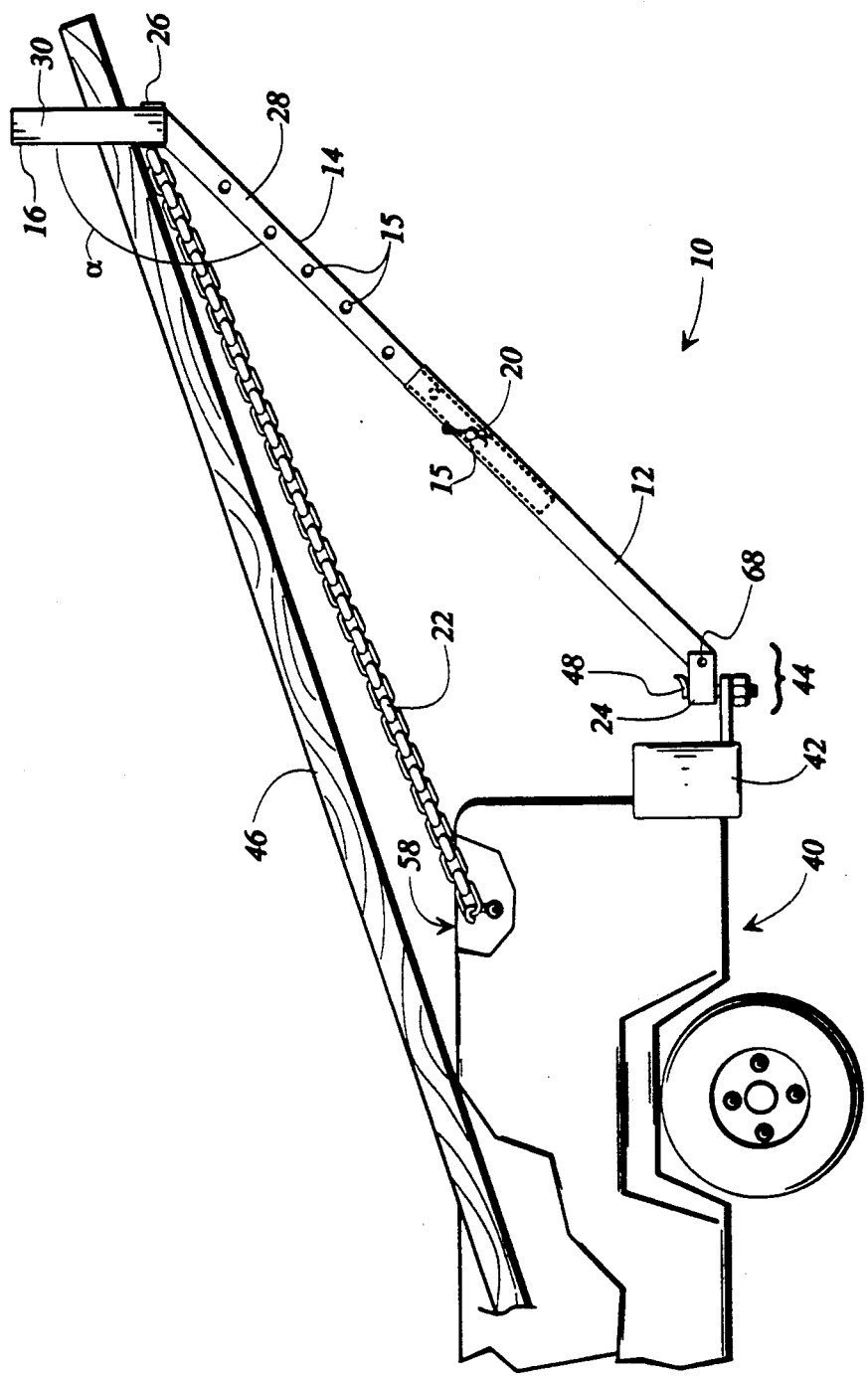
FIG. 1 is side view of a preferred embodiment of the invention shown attached to a vehicle and carrying an elongated load.
Figure 2:
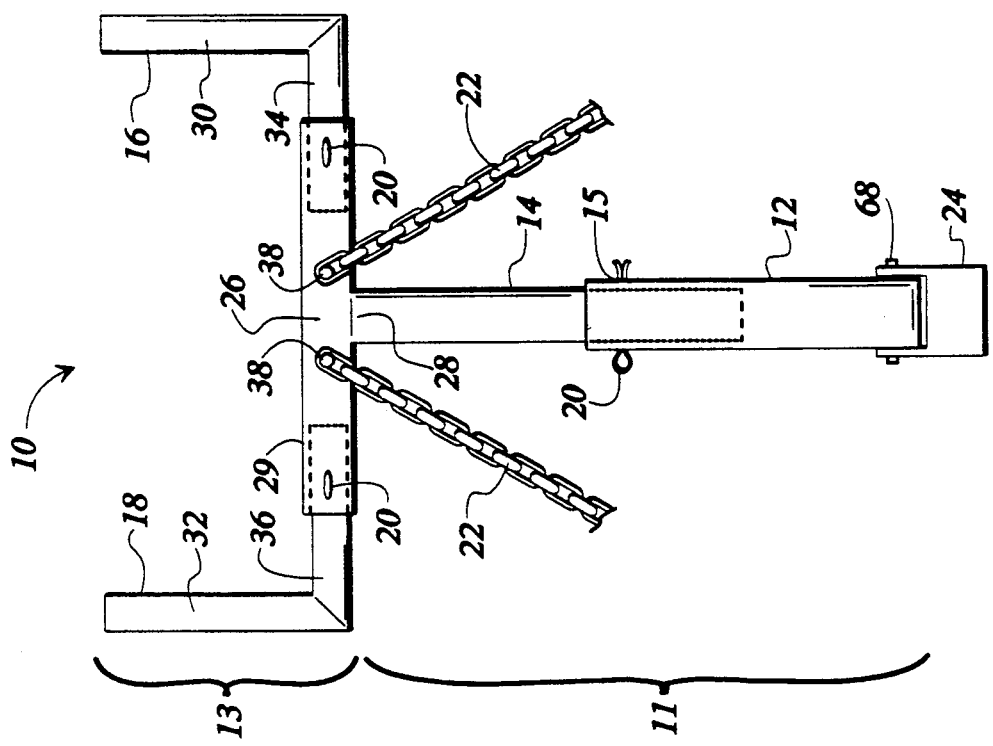
FIG. 2 is a front view of a preferred embodiment of the present invention.

A preferred embodiment of the vehicle extension 0 is shown in a preferred load carrying mode in FIG. 1 and in structural detail in FIG. 2. The extension 10 comprises a stabilizing bar 11 secured to a load bar 13 in a more or less "Y" configuration when viewed from the front or back. Each of the components of the stabilizer bar 11 and the load bar 13 generally are manufactured out of hollow square tubing having a hollow interior and 1/16" walls. It is preferable that the components be made out of a metal, such as, for example, mild steel, chromium, molybdenum steel, or aluminum. However, the components may be made out of wood, sturdy plastic or PVC material for use in load situations not requiring the strength of metals. Further, the components may be made out of any width and thickness materials or tubing as long as the desired structural strength is achieved.

The stabilizer bar 11 comprises a lower trunk 12 and an upper trunk 14. The upper trunk 14 has a cross-section somewhat smaller than the cross-section of lower trunk 12 such that the upper trunk 14 may be slidably received within the hollow interior of the lower trunk 12. Thus, the upper trunk 14 is slidably adjustable within the lower trunk 12 such that the ultimate length of the stabilizer bar 11 is adjustable within the bounds of the approximate lengths of lower trunk 12 and upper trunk 14.

The lower trunk 12 has an opposing pair of adjustment pinholes 15 drilled through the lower trunk wall on sides or surfaces opposite each other. Upper trunk 14 has a series of paired adjustment pinholes 15 drilled through the upper trunk 14 on sides or surfaces opposite each other. As the upper trunk 14 is adjusted within lower trunk 12 by sliding upper trunk 14 upwards or downwards within the hollow interior of lower trunk 12, the adjustment pinholes 15 in upper trunk 14 correspond with the adjustment pinholes 15 in lower trunk 12 such that a pin 20 may be placed through the corresponding pinholes 15, thus locking upper trunk 14 in a certain position within lower trunk 12. The incorporation of a number of pairs of adjustment pinholes 15 on upper trunk 14 allow the upper trunk 14 to be adjusted to a number of different positions relative to lower trunk 12, thus resulting in adjustable length stabilizer bar 11. Pin 20 may be any typical pin, such as a cotter pin, a piece of pipe or rod, or a bolt.

Load bar 13 comprises load bar housing 26, first side brace 16, and second side brace 18. Load bar housing 26 is securely attached to upper trunk 14 at joint 28, generally by a weld. Load bar housing 26 generally is secured to upper trunk 14 such that the angle $\alpha$ between the forward face of load bar housing 26 and the upper face of upper trunk 14 is approximately 135°. The upper surface 29 or more of load bar housing 26 may be coated with cloth or rubber or the like so as to present a less hard or abrasive surface to the load 46.

First side brace 16 and second side brace 18 generally are L-shaped components with first side brace 16 having a first side brace upright member 30 securely attached to a first side brace horizontal member 34, and second side brace 18 having a second side brace upright member 32 securely attached to a second side brace horizontal member 36. Both first side brace horizontal member 34 and second side brace horizontal member 36 have cross-sections somewhat smaller than the cross-section of load bar housing 26 such that first side brace horizontal member 34 and second side brace horizontal member 36 may be slidably received within the hollow interior of load bar housing 26. First side brace 16 and second side brace 18 generally are mirror images of each other.

The load bar housing 26 has an opposing pair of adjustment pinholes 15 drilled through its frontward and rearward facing walls on sides or surfaces opposite each other. Each horizontal member 34, 36 of each side brace 16, 18 has a series of paired adjustment pinholes 15 drilled through the side braces 16, 18 on sides or surfaces opposite each other. As the side braces 16, 18 are adjusted within load bar housing 26 by sliding one or both side braces 16, 18 inwards or outwards within the hollow interior of load bar housing 26, the adjustment pinholes 15 in side braces 16, 18 correspond with the adjustment pinholes 15 in load bar housing such that a pin 20 may be placed through the corresponding pinholes 15, thus locking side braces 16, 18 in certain positions within load bar housing 26. The incorporation of a number of pairs of adjustment pinholes 15 on side braces 16, 18 allow the side braces 16, 18 to be adjusted to a number of different positions relative to load bar housing 26, thus resulting in adjustable length load bar 13. Pin 20 may be any typical pin, such as a cotter pin, a piece of pipe or rod, or a bolt.

Various alternate embodiments of load bar 13 are shown in FIGS. 2a and 2b. FIG. 2a shows a V-shaped load bar 13 which may be more suitable for transporting small diameter pipes or rods. FIG. 2b represents a crescent load bar 13 which may be more suitable for transporting large diameter pipes or trees. As is obvious, the exact shape of the load bar 13 may be altered for various types of loads.

The extension 10 is releasably secured to the vehicle 40 by a trailer hitch assembly 44 and by securing chains or cables 22. The hitch assembly 44 is shown in more detail in FIG. 3 and is a fairly typical ball hitch assembly. Hitch assembly 44 comprises a hitch plate 50 securely attached to the bumper 42 of the truck 40. A ball 52 having a threaded neck 56 is inserted through a hole in the hitch plate 50 and secured to the hitch plate 50 by a nut 54. The hitch housing 24 has a typical hitch lever assembly 48 which cooperates with the ball 52 to secure the trailer hitch 24 onto the ball 52. The hitch housing 24 is pivotably connected to the lower trunk 12 of the stabilizer bar 11 by hitch pin 68.

A pair of chains or cables 22 are secured to the extension 10 by means of I-bolts 38. Preferably, the chains or cables 22 are attached as far as feasible from the vertical center of load bar housing 26 so as to create a more stable unit. Alternatively, both chains or cables 22 may be attached to the upper trunk 14 of stabilizer bar 11 using an I-bolt 38. Although chains or cables 22 and I-bolts 38 are the preferred embodiments, various alternatives for the chains or cables, such as wires, cords, rods or the like, and for the I-bolts, such as hooks, weldments or the like, may be used. The chains or cables 22 extend from the extension 10 and, as shown in more detail in FIGS. 5 and 6, are attached to the side walls 70 of the vehicle 40 bed.

Referring now to FIG. 5, a hook 60 is secured to the interior wall 70 of the vehicle 40 bed and a link of chain 22 is looped over the hook 60, thus holding the extension 10 in place. A hook assembly 58 comprising the hook 60 and the various attachment hardware is located on each side wall 70 of the vehicle 40, thus allowing both chains or cables 22 to be attached to the vehicle 40. Referring now to FIG. 6, the attachment hardware of the hook assembly 58 is shown in more detail. A bolt 62 is inserted through a hole in the side wall 70 of the vehicle 40. The bolt 62 is secured to the side wall 70 by means of a washer 64 and nut 66. The hook 60 is placed between two washers 64 and secured onto bolt 62 using another nut 66. In this manner, hook assembly 58 is secured to the vehicle 40 so as to provide a rigid support for chains or cables 22.

FIG. 4 shows a more detailed view of the slide adjustment mechanism for the stabilizer bar 11. Upper trunk 14, having a smaller cross-section than lower trunk 12, slides within the hollow interior of lower trunk 12 and is secured in place by means of pin 20. Upper trunk 14 has several opposing pinholes 15 through which pin 20 can pass. Lower trunk 12 has one opposing pair of adjustment pinholes 15 opposite each other. Upper trunk 14 is adjusted by sliding within lower trunk 12 until adjustment pinholes 15 on upper trunk 14 and lower trunk 12 correspond to each other at or near the desired ultimate length of stabilizer bar 11. Pin 20 then is inserted through adjustment pinholes 15, thus locking lower trunk 12 and upper trunk 14 in place relative to each other. The adjustment mechanism shown in FIG. 4 also is applicable to the adjustment mechanism for the side braces 16, 18 and load bar housing 26. For example, upper trunk 14 can also represent first side brace 16 or second side brace 18, and lower trunk 12 can represent load bar housing 26. The side braces 16, 18 are adjusted relative to the load bar housing 26 and to each other in the same manner as described for the stabilizer bar 11.

In operation, the operator takes the extension 10 and attaches it to the vehicle 40 via hitch assembly 44. The stabilizer bar 11 is adjusted to the desired length and the load bar 13 is adjusted to the desired width, as described above. The securing chains or cables 22 are then attached to the hook assembly 58 such that chains or cables 22 are relatively taut when the extension 10 is in the desired position. Chains or cables 22 prevent the extension 10 from rotating to the ground or from swaying from side to side. A load 46, such as a piece of wood or a pipe, is placed within the truck bed and laid to rest on the surface of load bar housing 26. As discussed above, the upper surface of the load bar housing 26 may be coated with rubber or cloth so as to provide a less hard or abrasive surface. The weight of the load 46 on the extension 10 causes securing chains or cables 22 to be in tension and causes stabilizer bar 11 to be in compression, thus creating a more secure unit.

The extension 10 is configured to carry lumber, pipes or any loads that are of lengths longer than the length of a typical truck bed. The extension 10 is configured so that the load 46 is mounted in the middle of the vehicle 40, the securing chains or cables 22 prevent the extension 10 from swaying from side to side, and the first side brace upright member 30 and second side brace upright member 32 prevent the load 46 from shifting from side to side and falling off the extension 10. The length of the stabilizer bar 11 generally is adjusted so that the rearward end of the load 46 distal from the vehicle 40 will not flex or bend toward the ground. The stabilizer bar 11 can be adjusted so that the load bar housing 26 is above windshield height so that it will not block the vehicle 40 driver's rearward view. Alternatively, the stabilizer bar 11 can be adjusted to a length such that the load 46 will not extend above the roof height of the cab such that the vehicle 40 operator can judge the height of the load by the height of the vehicle.

The extension 10 also can be equipped with safety items, such as caution lights or flags, signs, or reflectors.

As discussed above, the extension 10 can be manufactured out of any suitable materials which will bear the load 46 without failing. For example purposes only, a specific configuration of the extension 10 will be described. The extension 10 is manufactured out of square tubing 1/16" thick or ⅛" thick pipe. The tubing or pipe is made of mild steel, chromium, molybdenum steel, or aluminum. For low mass loads, the extension 10 may be made of wood, sturdy plastic, or PVC.

A standard 9½" by 2-9/16" by 2¾" trailer hitch 24 is attached to the lower trunk 12 of the stabilizer bar 11. The attachment is pivotably accomplished by using a 3-3/16" by ⅜" bolt and nut used as a hitch pin 68. This allows the extension 10 to be mounted on any vehicle 40 bumper that has a 1⅞" trailer ball 52 attached to it.

The stabilizer bar 11 lower trunk 12 is a 36" by 2¼" by hollow square tube. The stabilizer bar 11 upper trunk 14 is a 36" by 2! by 1¼" hollow square tube, such that the upper trunk 14 will fit within the hollow interior of the lower trunk 12. There is one pair of opposing ⅜" adjustment pinholes 15 drilled into the lower trunk 12 six inches from the upper end of the lower trunk 12, that is, the end of the lower trunk 12 proximal to the upper trunk 14. The upper trunk 14 has three pairs of opposing ⅜" adjustment pinholes 15 drilled into it, 12", 20", and 30" from where the load bar housing 26 is welded to the upper trunk 14. By using a 3" by ⅜" locking pin 20, the upper trunk 14 can be adjusted relative to the lower trunk 20 resulting in overall stabilizer bar lengths of 42", 50", and 60".

The load bar housing 26 is a 30" by 2¼" by 1½" hollow square tube that is welded to the upper trunk 14 at weld 28. Each of the first side brace 16 and second side brace 18 comprises a 15" by 2" by 1¼" first side brace horizontal member 34 and second side brace horizontal member 36, respectively. There is one pair of opposing ⅜" adjustment pinholes 15 drilled 3" from each end of the load bar housing 26. Each first side brace horizontal member 34 and second side brace horizontal member 36 has three pairs of opposing ⅜" adjustment pinholes 15 drilled into them, 6", 9", and 12" from their outer edges. By using a ⅜" by 3" locking pin 20 on each side of the load bar housing 26, the load bar 13 can be adjusted to attain widths of 36", 42", and 48".

Welded to the outer edges of each of the first side brace horizontal member 34 and second side brace horizontal member 36 are vertical 12" by 2" by 1174" pieces of hollow square tubing that serve as the first side brace upright member 30 and second side brace upright member 32, respectively. These upright members 30, 32 serve as prongs to keep the load 46 from sliding off of the side of the load bar 13.

The load bar housing 26 is welded to the stabilizer bar 11 at an angle so that when the extension 10 is tilted back 135° from the point of attachment to the trailer hitch assembly 44, the upper surface of the load bar housing 26 is horizontally level. This results in a 135° angle α between the forward face of load bar housing 26 and the upper surface of stabilizer 11.

The extension is stabilized relative to the vehicle 40 at three points. One point is the hitch assembly 44 and the other two points include the use of ¼" link chains attached to the vehicle 40 quarter panels by ⅜" S-hooks. The chains or cables 22 are attached to the extension 10 by using two 3" by 3/8" I-bolts mounted through the load bar housing 26. Generally, one I-bolt 38 is located on each side of the stabilizer bar 11. Each ⅜" S-hook 60 is attached to the vehicle 40 using a 1½" by ⅜" bolt 62.

The above description of a specific embodiment of the extension 10 is not meant to limit the invention to that specific description, nor is the above general description of a preferred embodiment meant to limit the invention to that general description, but are meant for illustrative purposes only.

What is claimed is:

1. A load bearing vehicle extension apparatus comprising:
    a tubular lower truss fore rearward disposition relative to the vehicle;
    a tubular upper truss perpendicular to said lower truss and rigidly secured thereto to support at least a portion of a load, said upper truss comprising a pair of spaced apart upstanding members; and
    means for releasably securing said lower truss and said upper truss to the vehicle, wherein said means for securing said upper truss to the vehicle is selected from the group consisting of chains, wires, cables, ropes, and rods.

2. The apparatus as claimed in claim 1, wherein said spaced apart upstanding members are movable relative to each other so as to effectively increase or decrease the length of said upper truss.

3. The apparatus as claimed in claim 1, wherein said lower truss comprises an upper trunk and a lower trunk, said upper trunk being slidably received within said lower trunk.

4. The apparatus as claimed in claim 1, wherein said means for securing said lower truss to the vehcile comprises a trailer hitch pivotably connected to said lower truss, which cooperates with a trailer hitch ball attached to the vehicle.

5. The apparatus as claimed in claim 1, comprising a pair of chains, wherein a first one of said chains secures said upper truss to a first side wall of the vehicle, and a second one of said chain secures said upper truss to a second side wall of the vehicle.

6. A load bearing vehicle extension apparatus comprising:
    a tubular lower truss comprising a lower trunk having a proximal end and a distal end, and an upper trunk comprising a proximal end and a distal end, said proximal end of said upper trunk being slidably received within said distal end of said lower trunk;
    a tubular upper truss secured normal to said distal end of said upper trunk;
    a pair of horizontal load trusses having proximal ends and distal ends, said proximal ends of said horizontal load trusses being slidably received within said upper truss;
    a pair of spaced apart upstanding members connected to the distal ends of said horizontal load trusses respectively; and
    means for attaching the apparatus to a vehicle,
    wherein said upper trunk and said lower trunk are slidably adjustable relative to each other such that said lower truss has an adjustable length, and said horizontal support trusses are slidably adjustable relative to each other within said upper truss such that said upper truss has an adjustable width.

7. The apparatus as claimed in claim 6, wherein said means for attaching the apparatus to a vehicle is selected form the group consisting of chains, wires, cables, ropes, and rods.

8. The apparatus as claimed in claim 7 wherein said means for attaching comprises a first chain and a second chain.

9. The apparatus as claimed in claim 8, wherein one end of said first chain is attached to said upper truss and a second end of said first chain is attached to the vehicle, and a first end of said second chain is attached to said upper truss and a second end of said second chain is attached to the vehicle.

10. The apparatus as claimed in claim 7, wherein said means for attaching further comprises a trailer hitch pivotably attached to the proximal end of said lower trunk, said trailer hitch cooperating with a trailer hitch ball attached to the vehicle.

11. The apparatus as claimed in claim 1, wherein said upper truss is coated, at least in part, with a material having a hardness such that the load will not be damaged when placed upon said upper truss.

12. The apparatus as claimed in claim 6, wherein said upper truss is coated, at least in part, with a material having a hardness such that the load will not be damaged when placed upon said upper truss.

* * * * *